United States Patent [19]

Kesterson

[11] Patent Number: 4,499,469

[45] Date of Patent: Feb. 12, 1985

[54] RADAR TESTER

[76] Inventor: John W. Kesterson, 6201 Turtle Dove Dr., Austin, Tex. 78744

[21] Appl. No.: 422,517

[22] Filed: Sep. 23, 1982

[51] Int. Cl.³ .......................... G01S 7/40; G01S 9/02
[52] U.S. Cl. ................................. 343/17.7; 343/7 TA
[58] Field of Search .................. 343/17.7, 7 TA, 7 A, 343/7 T; 434/51, 1, 2, 3, 1 T

[56] References Cited

U.S. PATENT DOCUMENTS

| | | | |
|---|---|---|---|
| 2,876,447 | 3/1959 | Witten et al. | 343/17.7 |
| 3,718,988 | 3/1973 | Ball et al. | 434/2 |
| 3,955,199 | 5/1976 | Hutzelman et al. | 343/17.7 |
| 4,053,890 | 10/1977 | Woodson et al. | 343/17.7 |

*Primary Examiner*—Maynard R. Wilbur
*Assistant Examiner*—Brian Steinberger
*Attorney, Agent, or Firm*—Donald J. Singer; Bernard E. Franz

[57] ABSTRACT

A radar system testing apparatus for use in evaluating radar performance of terrain following, forward looking radars, generally installed in the nose of military aircraft. The operator inputs the antenna position and rotational arc limits desired which are converted into reference voltages and compared to the antenna's true position by a logic comparator network. When the true position is within the operator's selected window, and the radar system inputs a trigger signal to indicate transmitter firing, the logic network will respond with a spiked waveform. This waveform traverses two consecutive one shot multivibrators with appropriate controls to vary the width of the resultant output pulses. By controlling the size of the pulses, the operator effectively selects a variety of target ranges and target widths for testing purposes. These controlled pulses are fed back into the radar system where they generate a simulated target return for evaluating the performance of the radar system under known conditions.

12 Claims, 3 Drawing Figures

RADAR TESTER

RIGHTS OF THE GOVERNMENT

The invention described herein may be manufactured and used by or for the Government of the United States for all governmental purposes without the payment of any royalty.

BACKGROUND OF THE INVENTION

This invention relates to radar testing apparatus in general and, more particularly, to apparatus for testing range capability and elevation target positioning in tracking radars.

Terrain-following radar is a specialized type of forward looking radar which provides a display of terrain ahead of a low flying military aircraft to permit manual or automatic control in order to maintain a constant altitude above the ground. This radar is comprised of complicated electronics and antenna elements usually located in the nose of the aircraft, such as with the AN/APQ-99 radar system of the RF-4C aircraft. As with any complex system, equipment malfunction and breakdowns do occur. Heretofore it has been the practice to appraise the operation of such a radar system using an AN/APM-395 Tester. This device automatically trouble-shoots, calibrates and initallizes the various components in the system but, unfortunately, requires in excess of eight hours to completely check out the radar. Additionally, the unit is large and cumbersome and requires two people to operate it. Quite often, an aircraft reports a radar malfunction along with a requirement that it be repaired within a certain time period which is substantially less than eight hours. In this situation, the only recourse is to perform trial-and-error component substitution relying on experienced technicians with day-to-day troubleshooting experience. Clearly, a need exits for some sort of text equipment to provide a quick reaction repair time capability with a reasonable degree of confidence that the basic functions of range accuracy and target elevation are operating properly.

An additional need exits with respect to the AN/APM-395 Tester. This testing device performs testing on the radar's target positioning circuits to observe its operation when presented with a target, such as a mountain. The AN/APM-395 performs this test by simulating a target which is infinitely high with respect to elevation and checking for a corresponding reaction of the radar's pitch steering bar. Clearly, it would be better to simulate a target with a definite altitude when checking the operation of the pitch steering bar.

Prior work in this area includes U.S. Pat. No. 2,876,447 which discloses an apparatus for monitoring a radar system by producing a visual indication when transmitter power and receiver sensitivity are within predetermined limits. Also, U.S. Pat. No. 4,053,890 teaches a radar testing apparatus in which a simulated target echo is automatically varied in range and signal strength and injected into a radar receiver to determine range sensitivity. While each of these patents is suitable for its intended purpose, neither invention is adaptable for use with the terrain-following radar onboard the RF-4C aircraft.

SUMMARY OF THE INVENTION

An object of the present invention is to test radar functions of prime importance within a minimum amount of time.

Another object of the present invention is to provide a simulated target echo which may be varied in range and altitude for use in testing radar receivers.

According to the invention, a signal from the radar representing the elevation position of the antenna is inputted to an analog comparator circuit for determining when the antenna position is within an adjustable specification window, thereby causing the invention to generate a simulated target echo of variable range when the invention receives the proper triggering signal. Buffering circuits for input and output signals are also provided, as is a power supply circuit. Range selectability circuits and target video adjustments are also included.

DETAILED DESCRIPTION OF THE PREFERRED EMBODIMENT

Prior to describing the test set and how it interacts with the terrain-following forward looking radar, it is first necessary to describe some common signals that are utilized and their origin.

a. 28 VDC: 28 volts direct current is the input power to the test set and is acquired from the radar system via an accessory cable.

b. Elevation Scan Demodulated (E1 Scan Demod) Signal: This signal is a varying DC potential that is representative of the actual elevation position of the forward looking radar antenna. The signal is obtained from the radar system via the accessory cable and is used in determining where the antenna is positioned at any instant in time.

c. Pre-Master Trigger (PMT) Signal: This signal is a pulse which is generated by the modulator circuit of the forward looking radar for use in the radar transmitter. It is also used by all of the timing circuits in the radar system to synchronize all actions with the firing of the transmitter. The signal is obtained from the radar system to synchronize the actions of the test set with the timing of the forward looking radar.

d. Video Out Signal: This signal is the final resultant output signal of the test set which is routed to the video inputs of the forward looking radar's computer (via coax cables and T connectors). By injecting the video signal into the radar system, accurate simulated radar returns will be generated on the radar's indicators.

Figure 1A:
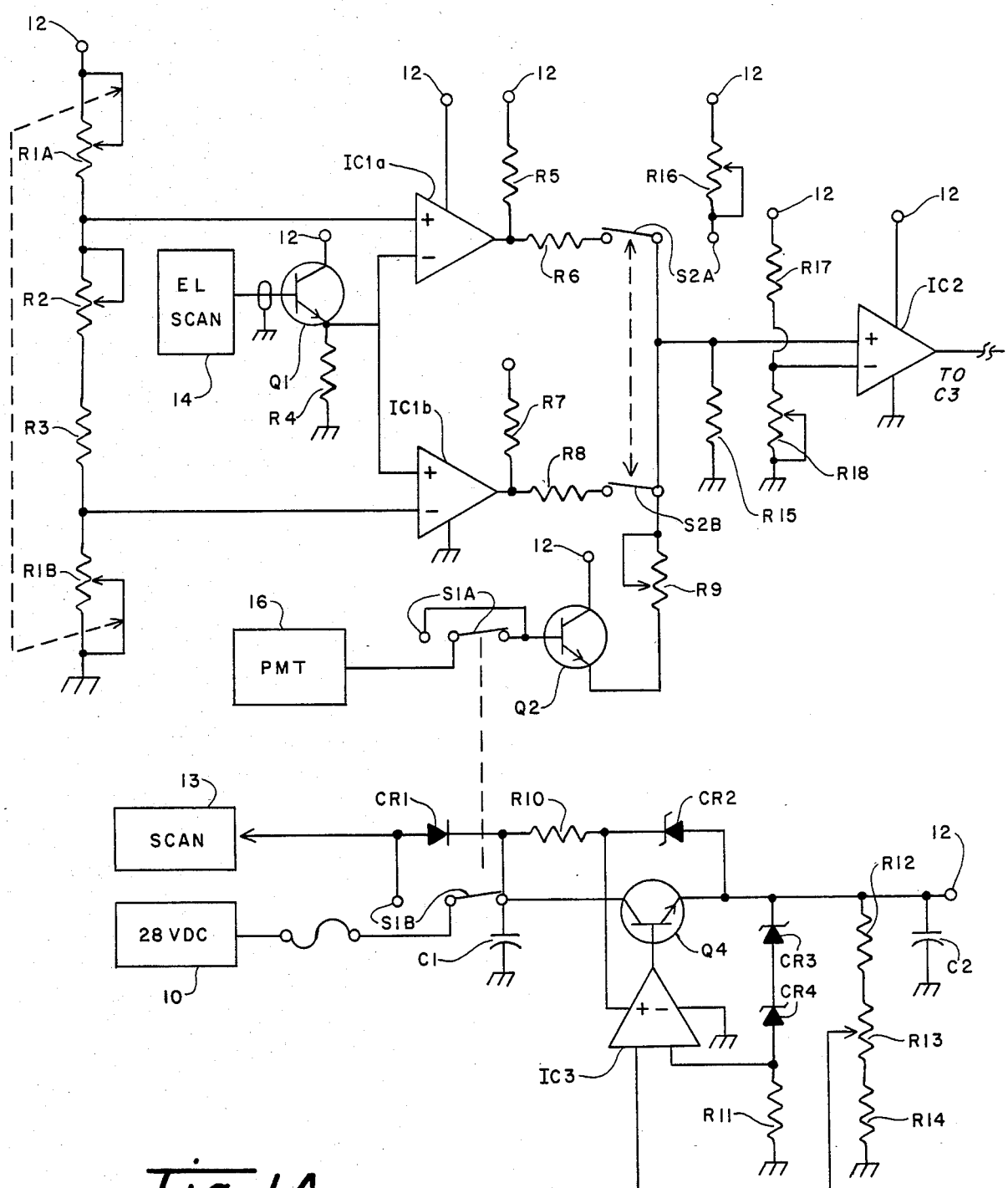
FIGS. 1a and 1b are schematic diagrams of the invention according to the preferred embodiment.
Figure 1B:
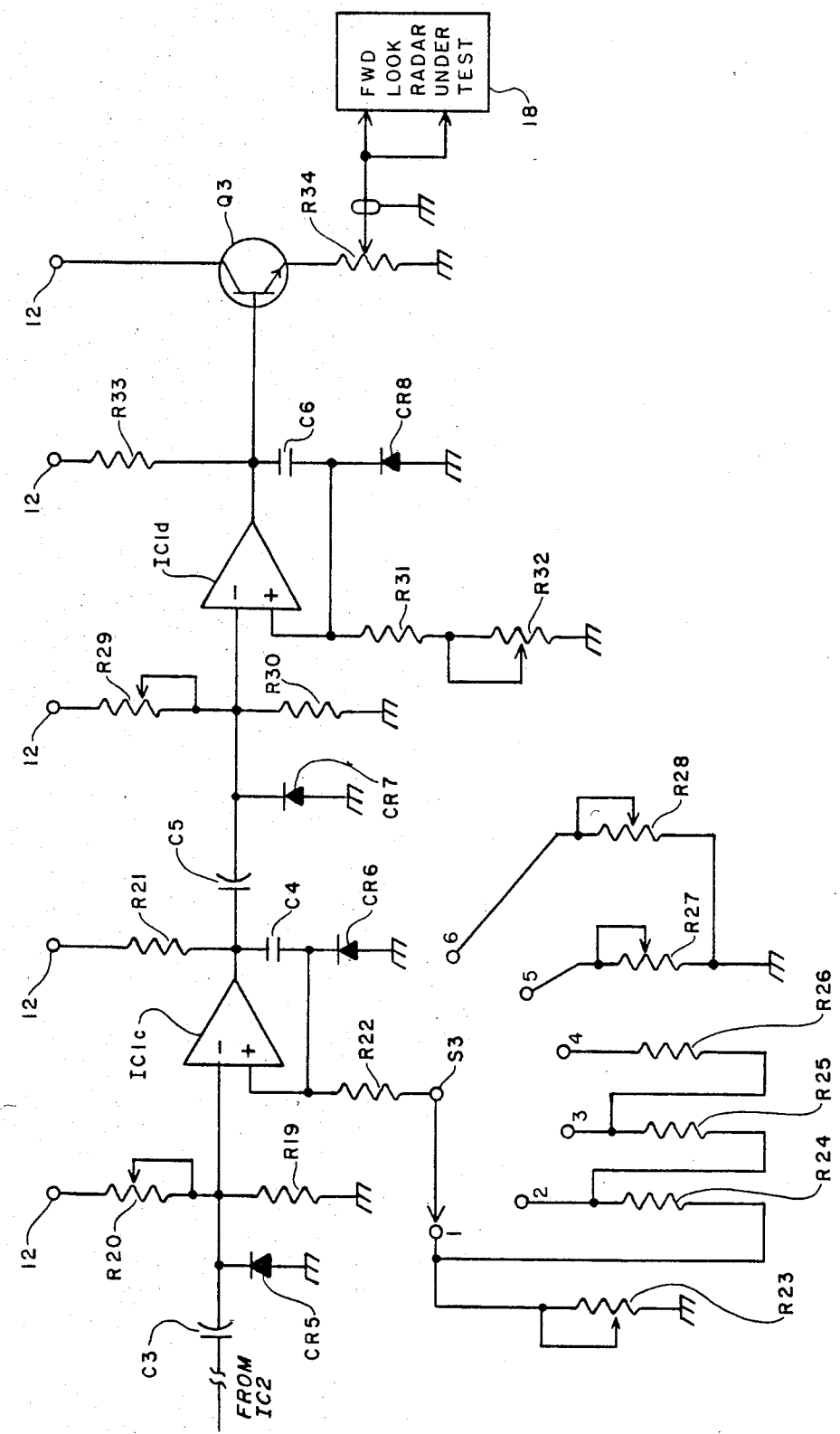

Referring to FIG. 1, the circuit of the preferred embodiment is composed of seven sections of which the first to be discussed is the power supply section. The power supply circuit derives a regulated source 12 of +20 volts DC from a source 10 of +28 volts DC aircraft power that is used as an input to the test set. The source 10 of 28 volts DC runs through a switch S1B to a transistor Q4 serving as a series regulator to produce the +20 volt source. Two zener diodes CR3 and CR4 are connected from the output of transistor Q4 to the input of an op amp IC3 to establish a reference voltage. A series of resistors R12, R13, and R14 are connected from the output of transistor Q4 to ground with R13 being a variable resistor also connected to op amp IC3 and providing feedback loop operation. A comparison within the op amp IC3 creates an op amp difference output signal which is fed as a control signal to transistor Q4. An additional bias from the regulated output through zener diode CR2 to op amp IC3 is also provided. Adjustment of the variable resistor controls the regulation of the +20 volt DC output 12 which is distributed throughout the system to other sections of the test set. The regulation of the power supply is effective in reducing the effects of varying input voltage and changing loads. Switch S1B is one side of a double pole, 3-position switch which allows normal power circuit operation in the ON position and no operation in the OFF position. A third position, known as the SCAN INTERRUPT position, allows the +28 volt DC to flow via diode CR1 to the previously discussed power regulation circuitry and also allows the +28 volt DC to flow back to the radar system's antenna scan circuit 13 via an accessory cable to cause the antenna movement to be interrupted. The other pole of switch S1 is connected to the Pre-Master Trigger input signal to permit it to enter the test set. Switch S1A allows this trigger signal into the test set when switch S1B is in either the ON or SCAN INTERRUPT position; however, the OFF position disconnects the trigger signal from the test set. This disconnect, which increases the input impedance, is to insure that the existence of the test set is as transparent to the radar system as possible.

The section of the circuit known as the elevation scan circuit is used to determine when the position of the radar system's antenna is within the user selected variable window of allowable specifications for elevation scanning. A source 14 of the elevation scan demodulated input signal is buffered via an emitter follower configuration of transistor Q1 and fed to the negative input of op amp IC1a and the positive input of op amp IC1b. Op amps IC1a and IC1b are quarter sections of an open collector output quad comparator, typically an LM339. The input signal, which is representative of the antenna position, is compared with DC potentials applied to the positive input of op amp IC1a and the negative input of op amp IC1b. The two DC potentials used are created by a resistive ladder consisting of four series resistors. R1a, R2, R3 and R1b between +20 volts and ground. Resistors R1a and R1b are variable resistors, ganged and balanced, which determine the levels of the reference voltages while variable resistor R2 determines the difference between the two DC potentials which are picked off between R1a and R2 for op amp IC1a and between R3 and R1b for op amp IC1b. The output signal of op amp IC1a will be high when the e1 scan demod signal is less than the reference voltage taken from the top of the resistive ladder and the output of op amp IC1b will be high when the e1 scan demod signal is greater than the reference voltage obtained from the bottom of the ladder, the net result being that the outputs of both op amp IC1a and IC1b will be high whenever the position of the radar's antenna is within the selected window. Resistors R1a and R1b are the e1 scan position controls on the front of the test set, while resistor R2 is the scan arc length control. The output signal of op amp IC1a is coupled through a resistor R6 to a switch S2A. The output signal of op amp IC1b is coupled through a resistor R8 to a switch S2B. An additional resistor R5 is connected just prior to resistor R6 to a positive 20 volts with a parallel resistor R7 connected just prior to resistor R8 also to a positive 20 volts. Resistors R5 and R7 are comparator pull up resistors which are necessary to the operation of the open collector outputs of op amps IC1a and IC1b.

A third section of the circuit allows the entrance of the Pre-Master Trigger signal from a source 16 through switch S1. The signal is fed through transistor Q2 in an emitter follower configuration for amplification and then to switch S2 via resistor R9. This section serves as a buffer to allow high input impedance current amplification of the trigger signal. Resistor R9 is variable to provide control of the impedance.

Switch S2 is a double pole, two position switch within the fourth section of the circuit, the gating and decision making section. Switch S2 can be positioned to select the terrain following operation (TFO) of the radar system or a second "other" operation. When in the "TFO" position, if the elevation scan demodulation signal is less than the high reference voltage and greater than the low reference voltage, and a Pre-Master Trigger signal is received by the test set, a reply will be generated. One pole of the switch S2A, connects the output signal of op amp IC1a to the input of another op amp IC2, while the second pole of the switch, S2B, connects the output signal of op amp IC1b to the same input of op amp IC2. The Pre-Master Trigger signal is also coupled to the same input of op amp IC2. A second input to op amp IC2 comes from a resistive ladder between a positive 20 volts and ground consisting of a resistor R17 in series with a variable resistor R18 with the input taken from the junction between the two. Resistor R18 is adjusted so that together with resistor R17 they will provide a reference voltage of 7.5 VDC to op amp IC2. Op amp IC2 typically functions as an active comparator, an analog AND gate, and includes a J-FET device. With switch S2 positioned to select TFO, and when the collectors of IC1a and IC1b are open allowing a portion of the 20 volts to pass via resistors R5, R6, R7, and R8 to op amp IC2 along with the coincidently arriving PMT signal through resistor R9, then the input of op amp IC2 will exceed 7.5 VDC at which time the output of op amp IC2 goes high for the duration of the PMT signal. The net result is that the test set will generate a reply when the elevation position of the antenna is within the selected window and the PMT signal is generated. Resistor R9 is adjustable so that a narrow PMT signal just causes the breaking of the 7.5 volt threshold voltage during the PMT signal and proper elevation positioning of the antenna. When switch S2 is positioned to accept other than TFO, the outputs of op amps IC1a and IC1b are disconnected and another voltage, from the +20 volt source coupled through a variable resistor R16, is connected in its place. Resistor R16 is adjusted so that the current through it will be enough, when summed with the PMT signal, that the threshold voltage will also be exceeded across resistor R15. When switch S2 is positioned to select "other" than TFO, the test set will process every transmitter pulse regardless of the elevation position of the antenna. For internal calibration, resistors R9, R16 and R18 are all trim pots located within the test set.

The output signal of op amp IC2 flows to the fifth section of the circuit, a range control circuit to enable the user to simulate targets at a variety of ranges. The output signal of op amp IC2 consists of the positive going pre-master trigger signal from the output of the analog AND gate and is fed through a capacitor C3 which differentiates it, resulting in a positive going spike followed closely by a negative going spike. This signal rides a DC potential created by a resistor R19 between the signal and ground and a variable resistor R20 between the signal and a positive 20 volts. The signal is fed into one shot multivibrator IC1c, typically LM339. A diode CR5 is inserted from ground to the signal, immediately following capacitor C3. By adjusting variable resistor R20, a delay trigger level sensitivity adjustment is tuned so that the negative going spike just exceeds the necessary level to forward bias diode CR5. This action will cause the triggering of the one shot multivibrator to produce a positive pulse as an output signal. The length of the pulse in time is determined by the charge time of a capacitor C4 connected to the output of the one shot through a connected resistor network. The network is composed of a directly connected resistor R21 to a positive 20 volts, another resistor R22 from the opposite side of capacitor C4 to a switch S3, and another resistive device which is selected by positioning switch S3. The switch S3 is a single pole, six position switch with each position selecting a different resistive value corresponding to a different range value. Position 1 on the switch connects a variable potentiometer R23 between resistor R22 and ground to allow the user an adjustment to determine the value of the first selectable range distance. Position 2 connects a resistor R24 between resistor R22 and position 1 of the same switch, thereby increasing the range an incremental amount. Position 3 connects a resistor R25 between resistor R22 and position 2, also increasing the range by the value of resistor R25. Position 4 connects a resistor R26 between resistor R22 and position 3, thus providing a fourth range setting with a degree of variability by pot R23. Position 5 connects a trim pot R27 between resistor R22 and ground to provide a more or less fixed calibrated range, typically one mile. Position 6 connects another trim pot R28 between resistor R22 and ground for a second calibrated range selection, typically eight miles. Resistors R27 and R28 are usually mounted internally while resistor R23 is typically mounted on a control panel along with switch S3. A shunt connection is inserted from the one shot IC1c to the junction between resistor R22 and capacitor C4 and a diode CR6 is inserted from ground to the same junction to speed up the resetting of the one shot. The output pulse signal from the one shot IC1c is differentiated through a capacitor C5 to obtain a positive spike followed by a negative spike where the negative (trailing edge of former pulse) spike will represent the desired delay in range. The pulse signal has now been replaced by a positive followed by a negative spike, the distance between varied by switch S3 and resistors R23, R24, R25, R26, R27 and R28.

The output signal from the range delay circuit flows to the target width circuit, whose operation is identical to that of the range delay circuit. The spikes that comprise the signal from the range delay circuit ride a DC potential created by a variable resistor R29 between the signal and a positive 20 volts and a fixed resistor R30 between the signal and ground. This signal is then fed into a one shot multivibrator IC1N, typically an LM339. A diode CR7 is inserted from ground to the signal immediately following capacitor C5. By adjusting resistor R29, the negative spike just exceeds the necessary level to forward bias diode CR7 which causes the triggering of one shot IC1d to produce a positive pulse as an output signal. (The positive spike has no effect on the multivibrator.) The width of the pulse is determined by the charge time of a capacitor C6 connected to the output of the one shot through a connected resistor network comprising a resistor R33 between a positive 20 volts and one side of a capacitor C6, and another resistor R31 from the opposite side of C6 to a variable pot R32, which is connected to ground. A shunt connection is inserted from the one shot IC1d to the junction between resistor R31 and capacitor C6 and a diode CR8 is inserted from ground to the same junction to speed up the resetting of the one shot. Resistor R29 is a trim pot only used internally for calibration, similar to pot R20. Operationally, the user adjusts the variable potentiometer R32 to control the width of the output pulse, thereby controlling the width of a simulated target. Typically, the user sets the pot so that the simulated radar return will be as narrow as can possibly be seen.

The output signal from the target width circuit flows to the seventh section, that is the output buffer circuit. This circuit is merely an isolation amplifier used to transfer the video signal output from multivibrator IC1d to a forward looking radar system 18. This signal from one shot IC1d is fed into the base of a transistor Q3 whose collector is biased with a positive 20 volts. Transistor Q3's emitter is fed into a variable resistor R34, which is grounded. The center tap of resistor R34 serves as the output path of the Video Out Signal and is connected to appropriate terminals of the forward looking radar system. Transistor Q3 coupled through resistor R34 thus prevents the radar system from externally loading the output of one shot IC1d which would affect its operation.

Figure 2:
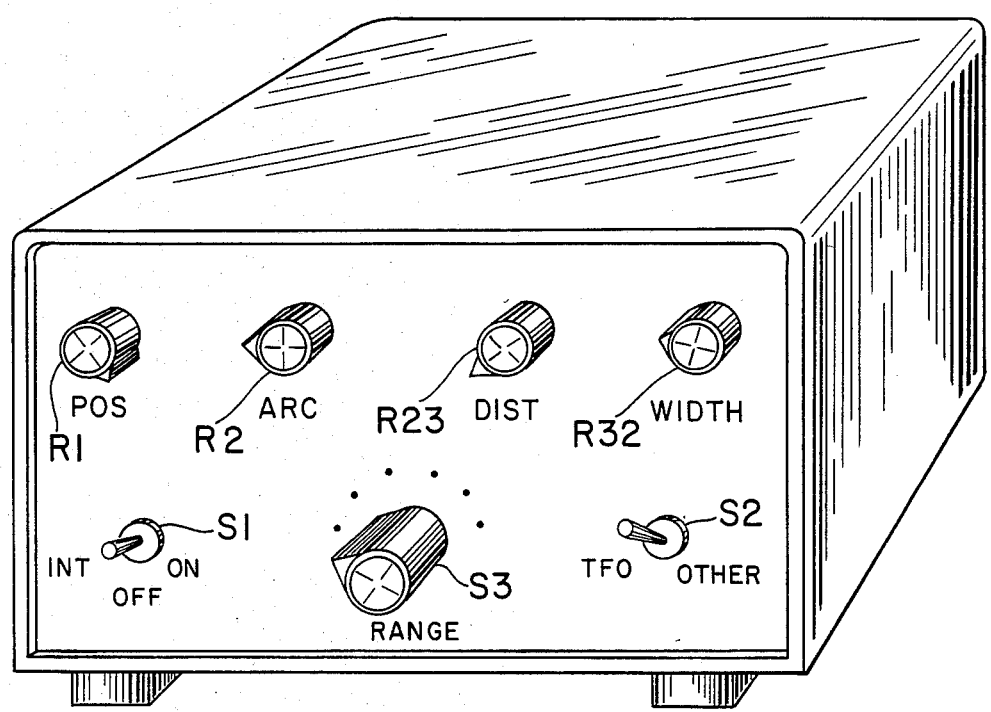
FIG. 2 is a layout diagram of a typical panel mounting arrangement of the user's controls of the invention.

Referring to FIG. 2, the front panel of the radar tester is shown with the user's controls indicated. As each of these controls were discussed earlier, only a brief description is now provided.

Switch S1 is the power switch for the radar tester which contains a third position to interrupt the scan of the forward looking radar's antenna while still maintaining power to the test set.

Switch S2 selects the mode of operation of the test set, either the terrain following operation (TFO) or an "other" mode. In the terrain following position, the elevation scan positioning and arc controls operate to select a window of antenna positioning so that the test set will simulate a target return signal when the radar's antenna is within the window. In the "other" position, the test set will supply a target return signal regardless of the positioning of the antenna or adjustments to the elevation scan and arc controls.

Potentiometer R1 is the elevation scan positioning control which determines the relative center elevation position of the antenna within the window. Potentiometer R2 is the arc control which determines how large the swing of the antenna is for the purpose of establishing the window. For example, if the elevation scan positioning control is set at +3 degrees and the arc control is set at +4 degrees, the test set will simulate a target return signal during the time the antenna travels from +1 degree to +5 degrees of elevation scan.

Switch S3 is the six position range switch which allows the simulated target return signal to be generated as though the target was at one of the six available ranges. Two of the six ranges are preset, while the remaining four are somewhat variable, with incremental advances by switch position. Control of this variability is provided by potentiometer R23 which adjusts a common resistor between the four switch positions, thereby adjusting the distance.

Potentiometer R32 varies the width of the simulated return signal. Typically, the operator adjusts this pot so that the target signal will be as narrow as can be seen.

Thus, while preferred constructional features are embodied in the structure illustrated herein, it is understood that changes and variations may be made by the skilled in the art without departing from the spirit and scope of the invention.

I claim:

1. Video signal generating apparatus for simulated target rapid testing of video circuits in a terrain following, forward-looking, airborne radar system having an elevation scan demodulated signal indicating the position of the radar antenna, and a trigger signal indicating the firing of the transmitter, said apparatus comprising:
   means for an operator to input a desired range of simulated target antenna positions:
   first logic means for comparing the operator's selected range of antenna positions with said elevation scan demodulated signal;
   second logic means for generating a simulated target initiating signal when the position of the radar antenna is within the range of operator selected antenna positions and said trigger signal is present;
   first converting means for converting said target initiating signal into a pulsed signal having operator controlled pulse length, thereby controlling the range to said simulated target;
   second converting means for converting said pulsed signal into a video signal second pulsed signal having operator controlled pulse width, thereby controlling the width of said simulated target; and
   means for coupling said video second pulsed signal to the video signal circuitry of said terrain-following, forward-looking, airborne radar system for rapidly evaluating the performance of the radar video system under controllable, stable conditions.

2. The apparatus of claim 1, wherein said means for an operator to input a desired range of antenna positions includes means for an operator to input a fixed position of said antenna in conjunction with means to input an arc length over which said antenna may rotate, said fixed position and said arc length being converted to two reference voltages.

3. The apparatus of claim 2, wherein said first logic means includes means for comparing each of said two reference voltages with said elevation scan demodulated signal's voltage level, such that an output signal of said first logic means is produced whenever said elevation scan demodulated signal's voltage level is between said two reference voltages.

4. The apparatus of claim 3, wherein said second logic means includes a coincidence function such that the presence of said output signal of said first logic meand together with the presence of said trigger signal results in said second logic means producing an output signal.

5. The apparatus of claim 4, wherein:
   said converting means includes a first monostable device for converting said output signal from said second logic means into a pulsed signal and control means for adjusting said first monostable device for controlling the length of the pulse therefrom, thereby controlling the range to said artificial target; and
   said converting means further includes differentiating means for converting said pulsed signal into a positive spike signal followed by a negative spike signal where the distance between said spikes coincides with the length of said pulse.

6. The apparatus of claim 5, wherein said converting means further includes a second monostable device coupled to said first monostable device for converting said negative spike signal into an output pulse signal and control means for adjusting said second monostable device for controlling the width of said pulse, thereby controlling the width of said artificial target.

7. The apparatus of claim 6, wherein said second logic means further includes switching means for disconnecting said output signal of said first logic means and substituting a constant voltage signal therefor, whereby said second logic means produces an output signal, coincident with the presence of said trigger signal, regardless of the position of the radar antenna.

8. The apparatus of claim 7, wherein said trigger signal is coupled through a signal buffering first amplifier prior to being fed to said second logic means.

9. The apparatus of claim 8, wherein said second monostable device's output signal is coupled through an isolation amplifier circuit to said radar system video circuitry.

10. Radar apparatus comprising:
   an airborne, terrain-following, forward-looking, radar set, said radar set including video signal processing circuits receiving signals from radar antenna energized microwave circuitry and further including circuit means for generating both a position signal representative of the position of said radar antenna and a modulator trigger signal representative of transmitter timing in said radar set;
   operator controllable antenna position reference signal source means for generating first and second reference signals comparable in magnitude with the amplitude of said antenna position signal from said radar set;
   first and second amplitude discriminator means responsive to said antenna position signal and to one each of said first and second reference signals for generating first and second position component signals collectively indicative of said antenna position signal having an amplitude between said first and second reference signals;
   third amplitude discriminator means responsive to said first and second position component signals and the presence of said trigger signal from said radar set for generating a target initiating signal in response to simultaneous presence of said trigger signal and positioning of said antenna within the position limits selected by said operator controllable antenna position reference signal source means;
   first time delay means responsive to said target initiating signal for generating a target starting signal following expiration of an operator selected range delay time interval;
   operator controllable second time delay means responsive to said target starting signal for generating a radar simulation target signal of operator determined second time delay; and
   adjustable coupling means for communicating a selected amplitude portion of said radar simulation target signal to the video signal circuitry of said radar set.

11. The apparatus of claim 10 further including a regulated power supply having a series pass transistor connected between a voltage source and a bus element supplying energy to target generating circuits external of said radar set, said series pass transistor being connected to receive controlling signals from a zener diode referenced operational amplifier.

12. The apparatus of claim 11 wherein said first, second and third amplitude discriminator means comprise operational amplifiers connected in open loop voltage discriminator circuits.

* * * * *

UNITED STATES PATENT AND TRADEMARK OFFICE
CERTIFICATE OF CORRECTION

PATENT NO.  : 4,499,469
DATED       : February 12, 1985
INVENTOR(S) : John W. Kesterson It is certified that error appears in the above-identified patent and that said Letters Patent is hereby corrected as shown below:

Column 1, line 40:  change "text" to "test".

Column 2, line 36:  change "E1" to "El" (numeral to letter)

Column 3, line 48:  change period to a comma.

Column 3, line 55:  change "el" to "el" (numeral to letter)

Column 3, line 58:  change "el" to "el" (numeral to letter)

Column 3, line 63:  change "el" to "el" (numeral to letter)

Column 5, line 63:  change "IC1N" to "ICld".

Column 7, line 58:  change "meand" to "means".

Signed and Sealed this

Eighteenth Day of June 1985

[SEAL]

Attest:

DONALD J. QUIGG

*Attesting Officer*    *Acting Commissioner of Patents and Trademarks*